Patented July 5, 1938

2,122,981

UNITED STATES PATENT OFFICE 2,122,981

TREATMENT OF FIBROUS MATERIALS AND OF PREPARATIONS THEREFOR

Winfrid Hentrich, Erlangen, Helmut Keppler, Leverkusen, and Hermann Holsten, Ludwigshafen-on-the-Rhine, Germany, assignors to I. G. Farbenindustrie Aktiengesellschaft, Frankfort-on-the-Main, Germany No Drawing. Application May 14, 1931, Serial No. 537,486. In Germany May 23, 1930

13 Claims. (Cl. 8—5)

The present invention relates to the treatment of fibrous materials and of preparations therefor.

We have found that fibrous materials, such as textiles or leather, can be considerably improved as regards their softness or state of purity or that the treatment of the said materials with agents hitherto usual, such as water, acids, alkalies, oils or dyestuffs or several of these agents can be considerably facilitated by treating the said materials with aqueous solutions of, or containing one or more organic ammonia substances which contain in their molecule at least one alkyl, i. e., open chain or cyclo-alkyl, radicle with at least 8 carbon atoms and at least one group selected from the class consisting of alcoholic groups and double linkages, i. e. with organic ammonia bases, e. g. amino or ammonium bases, or water-soluble salts of the said bases. The said alcoholic groups and/or double linkages may be situated in the said long aliphatic radicles or in further substituents of a nitrogen atom of the ammonia substances. Among the amines of the said kind may be mentioned the products obtained by the conversion of mineral acid esters of higher fatty alcohols with ammonia or amines. As the mineral acid esters may be mentioned for example the halogen hydracid esters (chlorides, bromides and iodides), the esters of sulphuric acid, as well as the organic sulphonic acids derived therefrom, such as toluene sulphonic acid and the like. Moreover, further alkyl and the like groups may be introduced into primary, secondary or tertiary amines corresponding to the higher fatty alcohols in order to arrive at products in which more than one organic radicle is combined with a nitrogen atom. The amines employed may be of aliphatic, cycloaliphatic, mixed aromatic-aliphatic, aromatic or heterocyclic nature or may contain several of these types of compounds simultaneously, provided they contain at least one alkyl or cycloalky group containing at least 8 carbon atoms. The said bases or their water-soluble salts, as for example chlorhydrates, sulphates, nitrates, acetates, lactates or formates, may be advantageously employed in all branches of the industries working the said fibrous materials and in daily use in which the washing power, the power of wetting materials which are only wetted otherwise with difficulty and the dispersive power is employed. Furthermore, the solutions or preparations have the additional valuable property of not being rendered inactive in the presence of acids and of yielding no insoluble precipitates with alkaline earths. The strongly basic quaternary salts of this series may also be employed as auxiliary agents for the improvement of fibrous materials even in alkaline baths, and the amines which are difficultly soluble in water or do not swell in water with the formation of stable emulsions also retain their softening and wetting properties in alkaline baths when their deposition is prevented by adding substances having emulsifying power or when they remain in solution by reason of hydroxyl or carboxyl groups contained therein which render them particularly soluble. In most cases ammonia substances containing from 10 to 20 carbon atoms in the aliphatic chain are employed; for wetting purposes those containing from 10 to 12 carbon atoms are preferred whereas for softening purposes those containing from 12 to 18 carbon atoms are usually employed. The quantities of the ammonia substances employed are generally from about 0.1 to about 5 per cent of the solutions for the treatment of the fibrous materials, corresponding quantities being employed if, primarily, non-aqueous preparations are desired; in most cases quantities of from about 0.1 to about 0.5 per cent are sufficient.

The aqueous solutions of the amines, ammonium bases or salts may be used with advantage in many processes of the textile and leather industries for softening fabrics, such as artificial silk, or leather; the amines, ammonium bases or salts facilitate the thorough dyeing of materials which are difficult to dye. Moreover, they have other valuable properties which render them suitable as auxiliary agents for the improvement of fibrous materials, as for example as additions when dyeing badly levelling dyestuff combinations, as wetting agent and the like in all branches of the textile industry in which acids are employed, as for example in carbonizing and the like. The solutions or preparations containing the amines, ammonium bases or salts may be employed alone or in admixture with a great variety of additions. As such may be mentioned the usual washing, wetting, and emulsifying agents, additions which increase the washing, wetting and emulsifying power, as for example inorganic or organic water-soluble salts and acids, perborates and the like, vegetable mucilages, soluble gums, glue, solvents of different kinds, such as cyclohexanone, trichlorethylene, benzyl alcohol, ethylene glycol mono-cresyl ether and the like or mixtures of these substances. By emulsifying oiling or impregnating substances such as paraffin wax, olive oil and the like in water by means of the said amines, ammonium bases or salts, oiling and impregnating agents valuable for the textile industry are obtained.

The following examples will further illustrate the nature of this invention but the invention is not restricted to these examples. The parts are by weight.

Example 1

5 parts of the sulphuric acid salts of a mixture of secondary and tertiary amines obtained by warming 100 parts of mono-oleylamine with 100 parts of dimethyl sulphate for 2 hours at about 70° C. and removing remainders of dimethyl sulphate are dissolved in 1000 parts of water. 20 parts of raw suint wool are introduced at from 40° to 45° C. into the bath thus prepared and are treated therein for 20 minutes. An excellent scoured wool is obtained which is not attacked in any way by reason of the neutral reaction of the bath.

Example 2

20 parts of cyclohexanol are stirred into 100 parts of an aqueous 10 per cent solution of mono-oleylamine lactate or acetate. A clear and stable emulsion having excellent degreasing power and capable of dilution to any desired extent is formed.

Example 3

A carbonizing bath is prepared by dissolving 2 parts of mono-oleyl trimethylammonium sulphate, obtainable as described in Example 1, in 1000 parts of sulphuric acid of 4° Baumé strength. The bath is used in the usual manner. Loose, scoured wool soaked with the said bath gives after drying a thoroughly carbonized wool. Instead of the salt of the quaternary base stated, the sulphate of the quaternary base obtainable by treating 4 parts of the hydrochloric salt of N-oleyl-N-diethyl ethylene diamine (which can be obtained from oleylamine and ω-chlor triethyl amine and corresponds to the formula

$C_{18}H_{35}—NH—C_2H_4—N=(C_2H_5)_2$ with 2 parts of dimethyl sulphate while warming to from 60° to 80° C. may be employed.

Example 4

A bath intended for softening artificial silk from viscose is prepared by dissolving 0.2 part of N-octodecyl-N-hydroxy-ethyl amine acetate in 100 parts of water and viscose silk is treated with 20 times its weight of the solution for 10 minutes, the silk then being centrifuged and dried. The touch of the silk is considerably softened and improved. The same effect is obtained with cotton fabrics. Instead of the aforesaid acetate the sodium salt of N-dodoecyl-N-hydroxy-ethyl amino acetic acid may be employed.

Example 5

Woolen piece goods are boiled for an hour in the usual manner in a dyebath which contains for each 100 parts of woolen piece goods, 0.25 part of anthraquinone blue SR extra (Schultz, Farbstofftabellen 1923, No. 861), 0.08 part of Tartrazine (ibid. No. 23), 0.03 part of naphthol red S (ibid. No. 168), 4 parts of sulphuric acid of 66° Baumé strength and, per liter of the bath, 0.1 gram of N-hydroxy-octodecyl-N-dimethyl amine sulphate. In spite of the small levelling power of the said combination of dyestuffs very well and thoroughly dyed goods are obtained. Instead of the said sulphate, 0.2 gram of a mixture of N-mono- and di-hydroxy-ethyl-N-hepta-decyl amines may be employed.

Example 6

8 parts of a 25 per cent aqueous solution of the hydrochloric salt of N-hydroxy-ethyl-N-dodecyl amine (obtainable from mono-ethanol amine and the sulphuric ester of dodecyl alcohol) are dissolved in 992 parts of water, and an equivalent quantity of dilute aqueous caustic soda solution is added. The 0.2 per cent aqueous solution of the amine is suitable for wetting out textile materials before a subsequent treatment with aqueous baths, the wetting power of the amine being still higher than that of its hydrochloride.

Example 7

20 parts of N-hydroxy-ethyl-N-octodecyl amine are stirred for 2 hours at from 40° to 50° C. together with 1000 parts of water and 250 parts of commercial ethyl alcohol until a homogeneous emulsion is obtained which is then cooled and slowly diluted with 1500 parts of water. The emulsion may find useful application for softening artificial silk from viscose as described in Example 4.

Example 8

50 parts of the hydrochloric salt of N-hydroxy-ethyl-N-octodecyl amine (obtainable from mono-ethanol amine and the sodium salt of the sulphuric ester of octodecyl alcohol) are dissolved at about 50° C. in 1000 parts of water, and 200 parts of tetra-hydronaphthalene are stirred into the solution. An opaque emulsion is obtained which removes stains of oil and the like from textile materials.

Example 9

3.5 parts of the lactic salt of N-pentadecyl-N-hydroxy-ethyl amine are worked into an emulsion together with 5 parts of powdered glue, 25 parts of olive oil and 66.5 parts of water. After dilution with 100 parts of water, textile materials can be efficiently oiled with the preparation obtained.

Example 10

5 parts of the acetic salts of the mixture of tertiary amines containing a cyclohexyl and a hydroxy-propyl radicle and radicles corresponding to the fatty acids of coconut oil, which mixture can be obtained by acting on the phosphoric esters from the mixture of alcohols prepared by a catalytic reduction of coco fat with N-cyclohexyl-N-propanol amine, are dissolved in 1000 parts of water. The solution allows of quickly wetting out textile materials before a treatment thereof with aqueous baths.

Example 11

300 parts of trichlorethylene are emulsified in an aqueous solution of 200 parts of the hydrochloric salt of a mixture of tertiary amines containing two hydroxy-ethyl groups connected with the nitrogen atom and one aliphatic radicle containing from 8 to 10 carbon atoms, obtainable by acting on di-ethanol amine with a sulphuric ester mixture of a fraction of alcohols boiling at from 90° to 140° C. at 150 millimeters mercury, such mixture being obtainable by catalytic reduction of coconut oil. By diluting the emulsion with water opalescent emulsions are obtained which possess a high washing power for removing stains from textiles.

Example 12

10 parts of oleyl-N-trimethyl ammonium sulphate are dissolved in 50 parts of water whereupon 100 parts of olive oil are slowly stirred into the solution. An emulsion is obtained which may be diluted with water and may find useful application for oiling textiles of any kind.

Example 13

A cotton fabric is treated with an aqueous 30 per cent solution of magnesium sulphate, containing per liter 5 grams of the acetic salt of N-dodecyl-N-hydroxy-ethyl amine obtainable from dodecyl amine and ethylene glycol chlorhydrin. Notwithstanding the weighting effect of the magnesium sulphate the fabric is very supple after the said treatment.

Example 14

50 parts of the sulphuric salt of N-dimethyl-N-hydroxy-ethyl-N-dodecyl ammonium hydroxide are dissolved in 1000 parts of water. The solution is an efficient cleansing agent for removing stains from textile fabrics.

Example 15

Woolen piece goods are treated at room temperature with a solution of sulphuric acid of from 2 to 4° Baumé strength containing, per liter, 2.5 grams of the acetic salt of N-hydroxy-ethyl-N-dodecyl amine until the goods are completely wetted, whereupon the goods are centrifuged and carbonized at from 95 to 100° C. for one hour. The vegetable impurities are then easily removed by mechanical means, whereas an unsatisfactory carbonization is obtained without the said addition of the said acetic salt.

Example 16

A mixed fabric from wool and cotton is dyed in a dyebath containing the acid wool dye fast light yellow E3G (Colour Index 1. ed., page 163 No. 636) or Sorbine red BB (Colour Index 1. ed., page 13 No. 54), sulphuric acid and Glauber's salt and, per liter, 1 gram of the mixture of mono- and di-hydroxy-ethyl-N-heptadecyl amines. A very evenly dyed fabric is obtained, the dyestuffs going equally to the cotton and wool fibres. Instead of the said amines a di-hydroxy-propyl-N-heptadecyl amine may be employed which can be obtained from heptadecyl amine and glycerol α-mono-chlorhydrin.

What we claim is:—

1. The process for improving organic fibrous materials, which comprises acting on the said materials with an aqueous solution comprising an organic ammonia substance containing at least one

linkage and directly attached to the nitrogen at least one aliphatic hydrocarbon radicle with at least 8 carbon atoms.

2. The process for improving organic fibrous materials, which comprises acting on the said materials with an aqueous solution comprising an organic ammonia base containing at least one

linkage and directly attached to the nitrogen at least one aliphatic hydrocarbon radicle with at least 8 carbon atoms.

3. The process for improving textile fabrics, which comprises acting on the said fabrics with an aqueous solution containing an acid wool dyestuff and an organic ammonia substance containing at least one

linkage and directly attached to the nitrogen at least one aliphatic hydrocarbon radicle with at least 8 carbon atoms.

4. As a composition of matter suitable for improving organic fibrous materials, an aqueous solution comprising an organic ammonia substance containing at least one

linkage and directly attached to the nitrogen at least one aliphatic hydrocarbon radicle with at least 8 carbon atoms.

5. As a composition of matter suitable for improving organic fibrous materials, an aqueous solution comprising a salt of an organic ammonia base containing at least one

linkage and directly attached to the nitrogen at least one aliphatic hydrocarbon radicle with at least 8 carbon atoms.

6. As a composition of matter suitable for improving organic fibrous materials, an aqueous solution comprising an organic ammonia substance containing directly attached to the nitrogen an aliphatic hydrocarbon radicle with at least 8 carbon atoms and at least one further aliphatic hydrocarbon radicle, at least one of said radicles containing at least one

linkage.

7. As a composition of matter suitable for improving organic fibrous materials, an aqueous solution containing from about 0.1 to about 5 per cent of an organic ammonia substance containing at least one

linkage and directly attached to the nitrogen at least one aliphatic hydrocarbon radicle with at least 8 carbon atoms.

8. As a composition of matter suitable for improving organic fibrous materials, an aqueous solution comprising an organic ammonia substance containing at least one

linkage and directly attached to the nitrogen at least one aliphatic hydrocarbon radicle with from 10 to 20 carbon atoms.

9. As a composition of matter suitable for improving organic fibrous materials, an aqueous solution comprising a quaternary ammonium base substance containing at least one

linkage and directly attached to the nitrogen at least one aliphatic hydrocarbon radicle with from 10 to 20 carbon atoms.

10. As a composition of matter suitable for improving organic fibrous materials, an aqueous solution comprising a salt of an organic ammonia base containing at least one

linkage and directly attached to the nitrogen at least one aliphatic hydrocarbon radicle with from 10 to 20 carbon atoms.

11. As a composition of matter suitable for improving organic fibrous materials, an aqueous solution comprising a salt of a quaternary ammonium base substance containing at least one

linkage and directly attached to the nitrogen at least one aliphatic hydrocarbon radicle with from 10 to 20 carbon atoms.

12. As a composition of matter suitable for improving organic fibrous materials, an aqueous solution comprising a dyestuff and a salt of an organic ammonia base containing at least one

linkage and directly attached to nitrogen at least one aliphatic hydrocarbon radicle with from 10 to 20 carbon atoms.

13. As a composition of matter suitable for improving organic fibrous materials, an aqueous solution comprising a dyestuff and a salt of a quaternary ammonium base containing at least one

linkage and directly attached to nitrogen at least one aliphatic hydrocarbon radicle with from 10 to 20 carbon atoms.

WINFRID HENTRICH.
HELMUT KEPPLER.
HERMANN HOLSTEN.